United States Patent [19]

Bragg, Jr. et al.

[11] 4,212,224
[45] Jul. 15, 1980

[54] JACKING SCREW TYPE FASTENER

[75] Inventors: Robert C. Bragg, Jr., Amesbury; John T. Hawley, North Chelmsford, both of Mass.

[73] Assignee: American Optical Corporation, Southbridge, Mass.

[21] Appl. No.: 945,169

[22] Filed: Sep. 25, 1978

[51] Int. Cl.² ............... F16B 35/00; F16B 39/00
[52] U.S. Cl. ........................... 85/1 K; 151/41.74
[58] Field of Search .................. 85/1 K, 32 K, 39; 151/41.74, 69, 37; 10/155 R; 29/512, 517, 515

[56] References Cited

U.S. PATENT DOCUMENTS

| | | | |
|---|---|---|---|
| 1,251,676 | 1/1918 | McCaffray | 85/1 K |
| 3,271,058 | 9/1966 | Anderson | 151/41.74 X |
| 3,746,067 | 7/1973 | Gulistan | 151/69 |
| 4,112,993 | 9/1978 | Dey | 151/41.74 |

FOREIGN PATENT DOCUMENTS

567863  8/1977  U.S.S.R. ........................ 85/1 K

*Primary Examiner*—Ramon S. Britts
*Attorney, Agent, or Firm*—Jeremiah J. Duggan; Stephen A. Schneeberger; Alan H. Spencer

[57] ABSTRACT

A combined threaded fastener and a collar adapted to be secured to the fastener around the shank portion of the fastener adjacent the head thereof. The shank portion of the fastener is adapted with a shoulder portion disposed adjacent the head portion and extending lengthwise of the shank of the threaded fastener for a predetermined extent. Adjacent the shoulder is an annular groove which in the preferred embodiment is generally circular in cross-section. The collar has an annular flange which serves as the bearing portion and is adapted to cooperate with the head portion of the fastener and a sleeve portion attached or extending longitudinally of the flange or bearing portion. The sleeve portion has a diameter sufficient so as to receive the shank portion of the fastener therein. The sleeve portion of the collar is also adapted with an annular groove which again in the preferred embodiment is substantially of circular cross-section. The annular groove is selected so as to be less than the thickness of the mounting means into which the fastener and collar are installed and further is adapted to contain a volume of material in the remaining portion of the sleeve adjacent said groove so as to be compressible into the annular groove of the fastener shank.

1 Claim, 5 Drawing Figures

JACKING SCREW TYPE FASTENER

BACKGROUND OF THE INVENTION

This invention relates to fasteners of the type utilized to secure removable modules or partitions to a receiving structure known as "jacking screws".

One specific application of a fastener of the type of the present invention is to secure drawers or modules containing electronic components into a cabinet or frame.

Another application for the present invention may be in the mounting of removable covers, access panels, drawers, inspection plates and the like to electrical, mechanical or hydraulic apparatus.

It may be realized in such installations that repeated fastening and unfastening of the jacking screw may be necessary in the servicing of the structure apparatus into which the fastener is disposed. Accordingly, in meeting one of the requirements of the present invention, it is necessary for a fastener of the type described to withstand repeated installations and removals without deterioration either of the fastener or the structure into which it is disposed.

In the case of threaded fasteners of which the present invention is included, the fastener must be disposed within the mounting device in which it is contained in such a manner as to permit relatively free rotary motion with respect to such mounting device as to allow relatively free insertion into the structure to which the mounting device is ultimately attached.

The illustrated embodiment of the present invention is in a jacking screw for electronic modules such as drawers occurring in scientific and medical instruments, which drawers often contain plug-in electrical connectors which are required to be firmly connected to their mating receptacles or plugs in instrument cabinets. Thus, it is necessary for the jacking screws to cause the modules or drawer to firmly seat in a cabinet, insuring proper alignment and contact of mating connecting members.

Illustrated in FIG. 1 and labeled "Prior Art" is a fastening device known and previously used for jacking screw installations. At least in some applications, the illustrated fasteners are not of sufficient heavy-duty construction for repeated heavy usage, as where the drawer or module being jacked in and out is either heavy or offers severe resistance to translational motion. In such instances, the head portion of the threaded fastener tends to back out of the retaining collar, destroying the jacking capabilities of the fastener; or it strips the collar completely from the mounting panel.

With the illustrated prior art jacking screw, it has been observed that during installation of the collar and fastener into the mounting device, the threaded fastener itself may be effectively captured by the collar mechanism such that relative rotary motion therebetween becomes difficult, if not impossible. It should be readily recognized that this undesirable aspect of the device available in the art can cause accelerated deterioration of the device as by imposing additional stresses upon the collar or threaded fastener portion, eventually leading to its pulling out of the mounting device, releasing the jacking screw or deterioration of the threaded fastener, e.g. head deterioration.

The present invention overcomes the problems exhibited by these prior art fasteners. The head portion of the threaded fastener is fully open such that it may be driven by either conventional screw driver mechanisms (blade or phillips head) or the head may be formed in conventional bolt-head (hex or other conventional pattern) construction. In the present invention, the fastener is captured into the collar portion by means of a compression or swagging technique which causes material of the collar to cold flow into special structure including grooves in the fastener providing a strong, yet flexible fit. The location of the groove is such that the bearing or frictional surfaces of the fastener and the collar permit, or, even promote relative rotary motion between the threaded portion of the fastener and the retaining collar. These and other features of the invention will be apparent from the following specification and claims.

SUMMARY OF THE INVENTION

In accordance with certain features of the invention, there is provided a combined threaded fastener and a collar adapted to be secured to the fastener around the shank portion of the fastener adjacent the head thereof. The shank portion of the fastener is adapted with a shoulder portion disposed adjacent the head portion and extending lengthwise of the shank of the threaded fastener for a predetermined extent. Adjacent the shoulder is an annular groove which in the preferred embodiment is generally circular in cross-section. The collar has an annular flange which serves as the bearing portion and is adapted to cooperate with the head portion of the fastener and a sleeve portion attached or extending longitudinally of the flange or bearing portion. The sleeve portion of the collar is also adapted with an annular groove which again in the preferred embodiment is substantially of circular cross-section. The annular groove is selected so as to be less than the thickness of the mounting means into which the fastener and collar are installed and further is adapted to contain a volume of material in the remaining portion of the sleeve adjacent said groove so as to be compressible into the annular groove of the fastener shank. It is an object of the present invention to provide a combined fastener for insertion into a mounting device so as to provide means for securing removable components to an overall assembly.

A further object of the invention is to provide such a fastener which will accommodate repeated usage without deterioration.

These and other objects of the invention will be aparent from the subsequent description of a preferred embodiment.

DESCRIPTION OF A PREFERRED EMBODIMENT

Figure 1A:
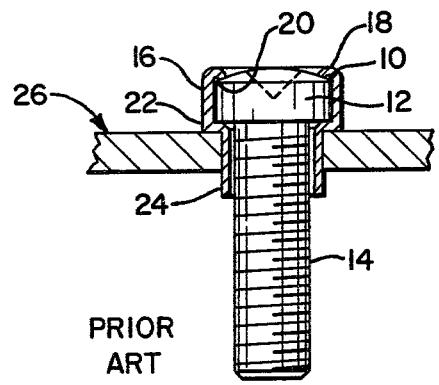
FIGS. 1A and 1B illustrate a fastening device known for use in installations comparable to the present invention and is labelled "Prior Art".

Referring now to the drawings and specifically FIG. 1, a jacking screw known in the art is illustrated. This prior art device is shown in order that the improvements of the present invention may be more readily understood. FIG. 1A illustrates a threaded fastener 10 having generally a head portion 12 and a shank portion 14. Disposed around the fastener 10 is a collar 16 having an annular flange 18 so as to engage the outer periphery of the head portion 12, as at 20. As may be observed in the FIG. 1A, the collar 16 is of generally cylindrical sections including a portion 22 which surrounds the head portion 12 of the fastener 10 and a sleeve portion 24 adjacent the portion 22 surrounding the portion of the shank portion of the fastener.

Figure 1B:
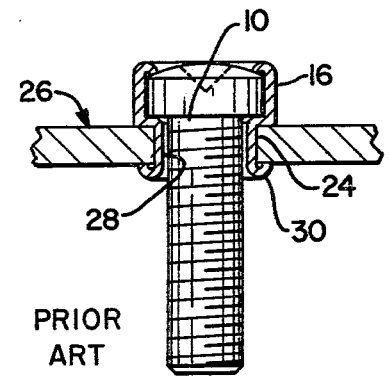

Turning now to FIG. 1B, fastener 10 is illustrated as disposed in a mounting device 26. It will be observed that the fastener collar 16 is disposed in the mounting device 26 as by being inserted through a hole 28 in the device and secured therein by that extension of sleeve portion 24 being swagged over, as at 30, to engage the underside of the mounting device.

Figure 2A:
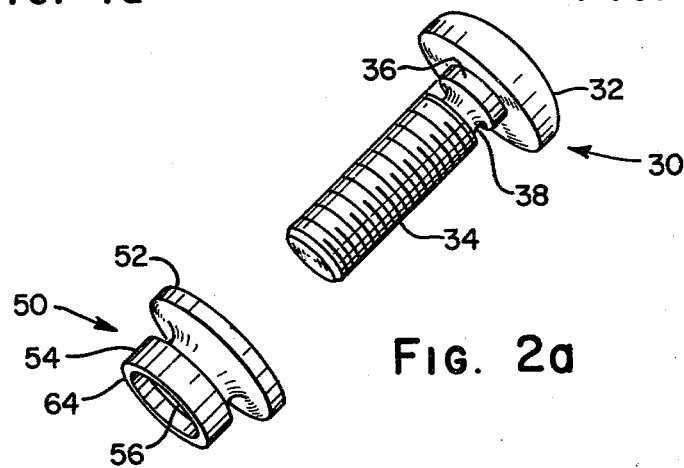
FIGS. 2 A–C illustrate the present invention respectively in (A) an exploded pictorial view, (B) a cross-sectional view when initially inserted into a mounting device and (C) in cross-sectional view as finally secured in a mounting device.
Figure 2B:
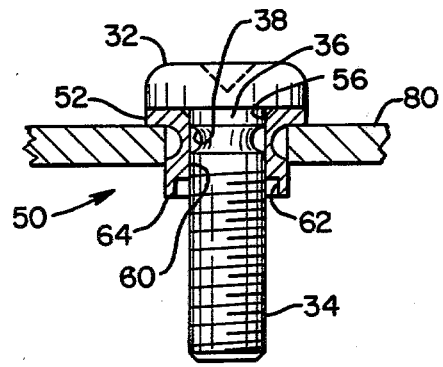
Figure 2C:
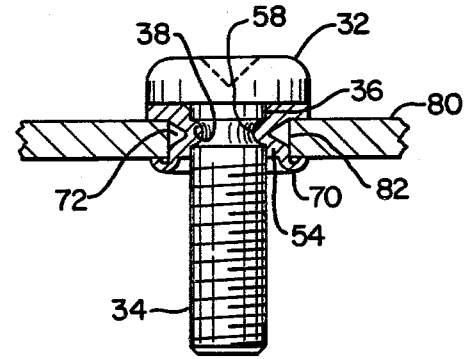

Turning now to FIGS. 2A–C, the present invention is illustrated. Reference numeral 30 indicates a threaded fastener having a head portion 32 and a shank portion 34. The head or shank and thread ultimately rolled thereon may be anyone of those deemed appropriate by design choice which exist in the art. In the present invention, however, shank portion 34 is adapted with a shoulder 36 disposed adjacent head portion 32. In the present embodiment, this shoulder portion 36 is an extent of unthreaded portion of a shank 34 and extends for a length of approximately 78 thousandths of an inch from head portion 32. The thread and fastener illustrated in the present invention is for utilization in such as the securing removable drawers of electronic components in electronic instruments. It should be recognized that the length of this shoulder 36 is chosen to meet the particular requirements of the installation. In the present embodiment, this length of 0.078 of an inch has been found suitable for providing free movement between the threaded fastener 32 and the collar 50 of similar material and subsequently described.

Adjacent shoulder 36 in the shank portion 34 is an annular groove 38. In the present embodiment the annular groove 38 is a semi-circular cross-section of a depth of approximately 3 hundredths of an inch and a span or diameter of 6 hundredths of an inch. As stated previously, these dimensions are chosen for desired characteristics when the combined jacking screw is disposed in the mounting device. Depending upon the particular materials chosen for the screw 30 and the collar 50 and the ultimate thickness of the mounting device into which the collar and screw are inserted, the dimensions given may be modified. We have found that the cross-section of the groove portion 38 is necessarily generally of an arcuate perimeter. While this groove need not necessarily be a semi-circular cross-section as in the present embodiment, sharp angles in the cross-section are to be avoided. By so doing, groove 38 is more effective in capturing material of the collar which is swagged thereinto during the assembly operation (subsequently described).

Additionally, the avoidance of sharp angles in such grooves in fastener 30 tends to minimize potential fracture stresses which could be induced in the fastener during installation.

Collar 50 is generally cylindrical in shape having a bearing portion 52 and sleeve portion 54. In the preferred embodiment, the bearing portion 52 has a diameter approximately equal to that of head portion 32 of fastener 30. Internal diameter 56 of collar 50 is slightly larger than shank portion 34 so as to provide for a loose fit therein. In the illustrated embodiment, bearing portion has a thickness which is substantially equal to the longitudinal extent of shoulder portion 36. These dimensions are coordinated to insure swagging of collar material 58 into groove portion 38 of the fastener 30 during the assembly operation. While these dimensions might be varied slightly for different material, the difference in these dimensions should not exceed about ten percent (10%) of the thickness of shoulder 36. Collar 50 is adapted with a groove portion 58 in sleeve portion 54 as indicated in FIG. 2A. As previously described with the fastener 30, this grooved portion has a non-angular cross-section and preferably with a perimeter of a generally arcuate shape. In the collar portion, it is more necessary than in the fastener to avoid a sharp angle in the cross section of the groove 58. Due to the amount of swagging during assembly of the material, as at 60, adjacent the groove 58, fractures may readily occur. In the illustrated embodiment, the groove 58 is of generally circular cross-section, however, these could be any well-rounded curve such as a hyperbola or elipse.

In the illustrated embodiment, the groove for the collar was approximately 125 thousandths of an inch in width and approximately 45 thousandths of an inch in depth. The thickness of the material remaining in the collar at 60 was approximately 17 thousandths of an inch. The volume of material in the cylindrical ring including the groove 58 in the material adjacent thereto should be equal to or less than the volume of groove 38 of fastener 30 and the portion of the hole in the mounting device in which the collar is inserted extending radially from the boundaries of the groove 38.

Collar 50 is further adapted in sleeve portion 54 with an annular groove 62 at the end of sleeve opposite bearing surface 52. As may be seen in FIG. 2C, this region of sleeve 54 adjacent groove 62 being portion 64 is swagged over as at 70 and FIG. 2C to complete the insertion of collar 50 into a mounting device 80. The depth of groove both radially and longitudinally in sleeve portion 54 is coordinated to the swagging characteristic of the material chosen for collar 50 such that a firm fit of collar 50 in the mounting device 80 may be procured. In the illusrated embodiment the dimensions of this groove were 125 thousandths×45 thousandths of an inch.

Turning now to FIG. 2C, the compressed assembly of the collar 50 and threaded fastener 30 forming the combined jacking screw combination are illustrated as inserted in mounting device 80. It may be seen that during a compression operation (installation) groove 38 is filed with material as at 60 of collar 58 such that the groove 38 is substantially filled. With the control of the volume of material as previously described in adjacent groove 58, a slight void 72 occurs in the mounting hole 82 of mounting device 80. The occurrence of the slight void 72 enables a complete swagging of the collar into the mounting device 80 with the flared ends as at 70. Maintenance of the dimensions previously described shoulder 36 and the void 72 have provided in the illustrated embodiment a fastener 30 which freely turns in the swagged collar 50 after insertion in the mounting device 80. As described earlier, this is a desirable feature in a jacking screw since its functional aim is to draw modules, panels or the like into a seated position in a mounting device such as electronic apparatus in a mounting device.

As previously mentioned, the threaded fastener was a type #¼-20UNC-2B. Preferred materials for both the fastener and the collar are cold rolled steel or stainless steel such as Type 1010, 1020 CRS or 303 S.S. Conventional coatings such as cadmium or the like may be included on the threaded fastener without interference with the functions described in the invention. The head portion 32 of the fastener may be adapted with any of the conventional driving adaptations such as hex-head slot or phillips-head slot for sockets or screw drivers. The thread disposed on shank portion 34 is conventionally a coarse machine thread, however, this is not critical to the invention. A fine machine thread or other known thread may be rolled on this shaft where the particular installation application was desirable. Conceivably, the fastener could be rolled with a self-tapping thread or a locking thread were the particular installation a utility made such a design choice.

While we have shown and described a complete embodiment of the present invention, it is understood that the same is not limited thereto but may be adapted with numerous changes and modifications as known to persons skilled in the art. The present invention should be limited only by the description thereof in the appended claims.

We claim:

1. The combination of a threaded fastener having a head portion and a shank portion and a collar adapted to be secured to said fastener around said shank portion adjacent said head portion, however, permitting relative rotary motion of said fastener with respect to said collar while preventing relative axial motion therebetween, wherein the improvement comprises:

said shank portion having a shoulder portion disposed adjacent said head portion said shoulder portion extending lengthwise of said shank for a predetermined extent;

said threaded fastener shank portion being provided with an annular groove adjacent said shoulder portion, said groove having a width substantially equal or exceeding its depth and having a cross-section with a generally arcuate perimeter;

said collar having an enlarged bearing portion adapted to cooperate with the head portion of said fastener and a cylindrical sleeve portion extending longitudinally of said bearing portion said sleeve portion having a diameter of sufficient dimension so as to rotatably receive the shank portion of said fastener therein;

said collar sleeve portion being further provided with an annular groove adjacent said bearing portion, said groove having a width substantially equal to or greater than its depth and having a cross-section with a generally arcuate perimeter, however, said width of said groove being less than the thickness of the mounting device into which said combined fastener is installed, the material of said sleeve proximate said groove being compressible into said groove in said shank portion;

said collar sleeve portion being further provided at its end opposite said bearing portion with a flange extending generally longitudinally of said sleeve and adapted to be swagged against said mounting device to secure said fastener therein.

* * * * *